United States Patent
Brenner

(10) Patent No.: US 7,191,098 B1
(45) Date of Patent: Mar. 13, 2007

(54) AUTOMATIC DETECTION OF EXCESSIVE INTERRUPT-DISABLED OPERATING SYSTEM CODE

(75) Inventor: Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/232,739

(22) Filed: Sep. 22, 2005

(51) Int. Cl.
*G06F 11/30* (2006.01)
(52) U.S. Cl. ......................................... 702/186; 714/25
(58) Field of Classification Search ................ 702/186, 702/182–185, 188; 714/25, 30, 48; 707/10; 709/218, 223
See application file for complete search history.

(56) References Cited

U.S. PATENT DOCUMENTS 5,708,417 A * 1/1998 Tallman et al. ........ 340/539.23

OTHER PUBLICATIONS

Bealkowski et al., "Watch Dog Timer Interface", IBM Technical Disclosure Bulletin, Apr. 1988, pp. 272-276.
Ballou et al., "Technique for Monitoring a Computer System's Activity for the Purpose of Power Management of a DOS-Compatible System", IBM Technical Disclosure Bulletin, Sep. 1990, pp. 474-477.

* cited by examiner

*Primary Examiner*—Edward Raymond
(74) *Attorney, Agent, or Firm*—Duke W. Yee; Marilyn Smith Dawkins; Gerald H. Glanzman

(57) ABSTRACT

Method and system for detecting and reporting an excessive period of interrupt disablement in operating system programming in a data processing system. A method for detecting and reporting an excessive period of disablement in operating system programming in a data processing system includes determining, at a plurality of scheduled times, if an operating system task is running disabled for interrupts, and reporting an excessive disablement if the operating system task runs disabled for interrupts for a predefined number of consecutive scheduled times.

20 Claims, 3 Drawing Sheets

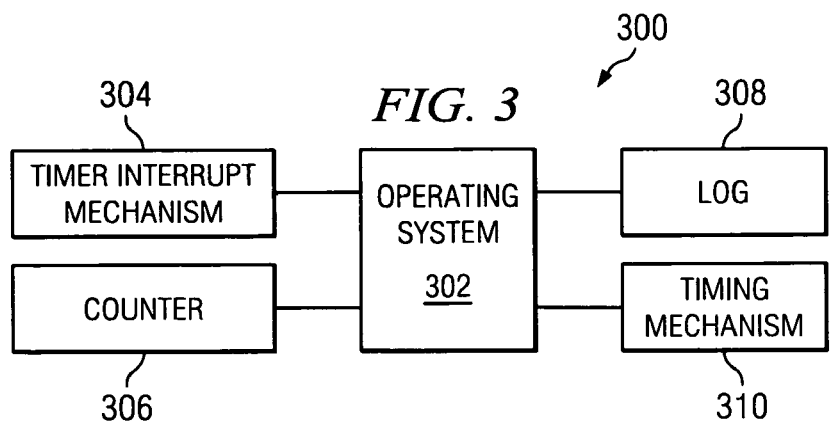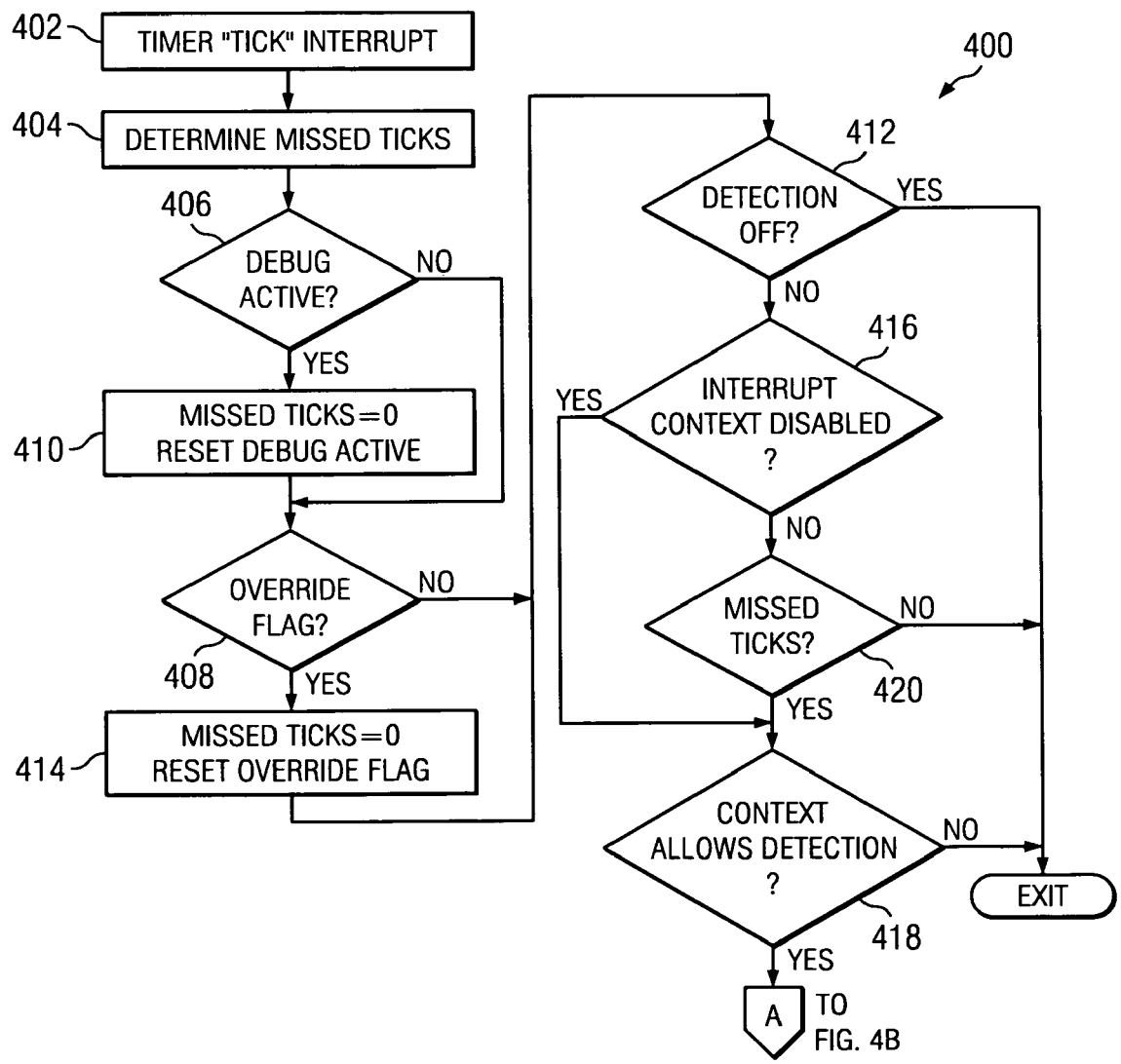

AUTOMATIC DETECTION OF EXCESSIVE INTERRUPT-DISABLED OPERATING SYSTEM CODE

BACKGROUND OF THE INVENTION

1. Field of the Invention

The present invention relates generally to the data processing field, and more particularly, to a method and system for detecting and reporting an excessive period of interrupt disablement in operating system programming in a data processing system.

2. Description of the Related Art

Operating system programming must frequently disable itself for interrupts when executing a "critical section" of code. Disablement is necessary for the code to serialize itself and to guarantee correctness. If, however, the amount of time spent disabled is excessive, performance problems can arise, particularly when the disablement conflicts with real time applications or with timing sensitive device drivers. Unfortunately, excessive periods of disablement are rarely detected, enabling them to escape into the field where they often lead to difficulties at customer sites.

One way to detect excessive periods of disablement of operating system programming is to add timing code on all critical paths of the operating system, in particular, those which either disable or enable for interrupts, and thereby accurately measure the disabled periods. Such an approach, however, would add significant overhead to an operating system since interrupt disablement and re-enablement is an extremely frequent and performance critical operation. Interrupt handling is also always disabled and would need to be timed in this manner, as well.

There is, accordingly, a need for a method and system for detecting and reporting an excessive period of interrupt disablement in operating system programming in a data processing system that does not add significant overhead to the operating system.

SUMMARY OF THE INVENTION

The present invention provides a method and system for detecting and reporting an excessive period of interrupt disablement in operating system programming in a data processing system. A method for detecting and reporting an excessive period of disablement in operating system programming in a data processing system includes determining, at a plurality of scheduled times, if an operating system task is running disabled for interrupts, and reporting an excessive disablement if the operating system task runs disabled for interrupts for a predefined number of consecutive scheduled times.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram that schematically illustrates a system for detecting and reporting an excessive period of interrupt disablement in operating system programming in a data processing system according to an exemplary embodiment of the present invention; and FIGS. 4A and 4B together illustrate a method for detecting and reporting an excessive period of interrupt disablement in operating system programming in a data processing system according to an exemplary embodiment of the present invention.

DETAILED DESCRIPTION OF THE PREFERRED EMBODIMENT

Figure 1:
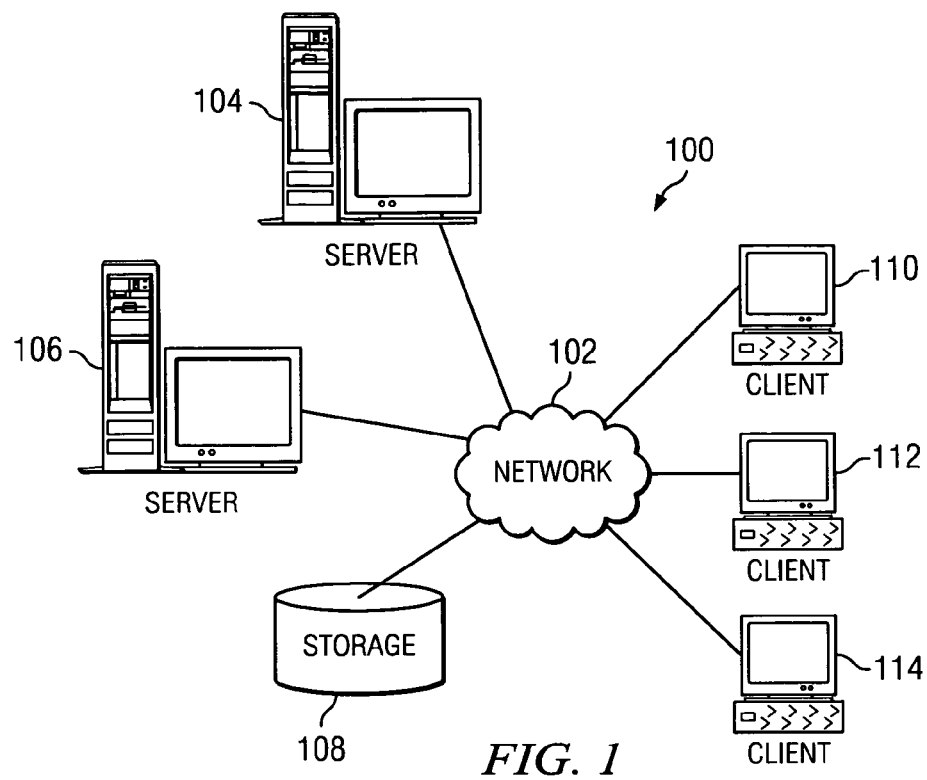
FIG. 1 depicts a pictorial representation of a network of data processing systems in which aspects of the present invention may be implemented.
Figure 2:
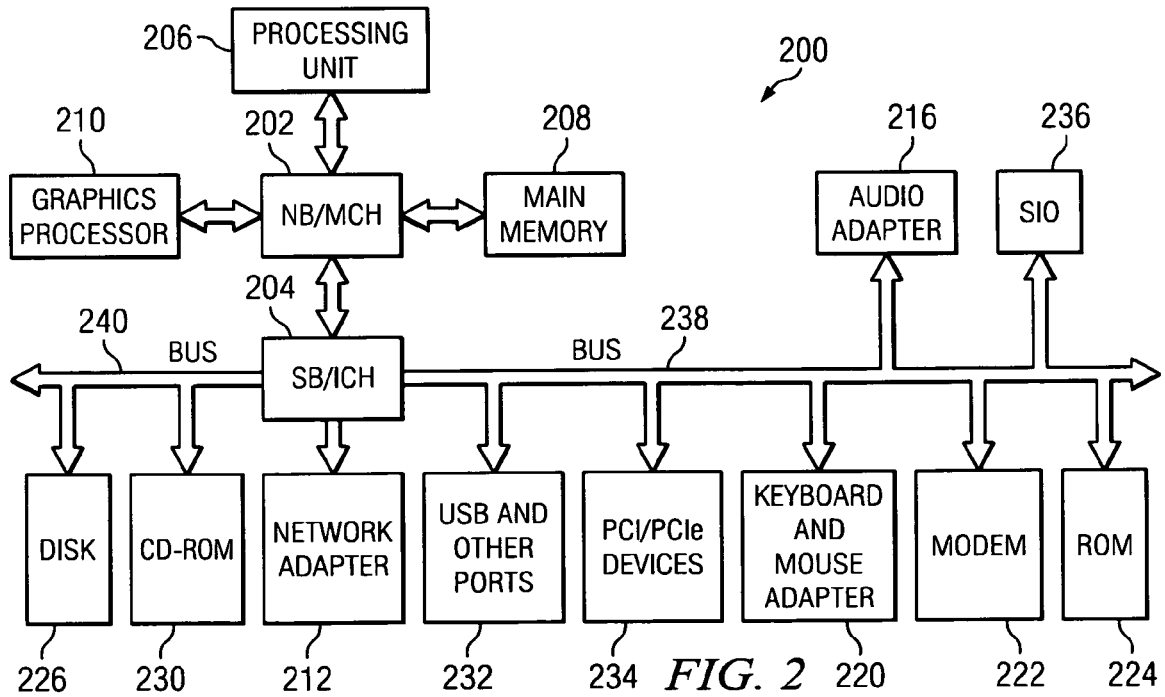
FIG. 2 depicts a block diagram of a data processing system in which aspects of the present invention may be implemented.

FIGS. 1–2 are provided as exemplary diagrams of data processing environments in which embodiments of the present invention may be implemented. It should be appreciated that FIGS. 1–2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1–2 may vary depending on the implementation. Other internal hardware or peripheral devices, such as flash memory, equivalent non-volatile memory, or optical disk drives and the like, may be used in addition to or in place of the hardware depicted in FIGS. 1–2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1–2 and above-described examples are not meant to imply architectural limitations. For example, data processing system 200 also may be a tablet computer, laptop computer, or telephone device in addition to taking the form of a PDA.

The present invention provides a method and system for detecting and reporting an excessive period of interrupt disablement in operating system programming in a data processing system. According to an exemplary embodiment of the invention, existing, regularly scheduled "timer tick" interrupts are used to profile the kernel's disablement behavior. Timer tick interrupts are typical of UNIX® systems; however, all operating systems generate periodic timer interrupts to guarantee proper time slicing behavior. Since these interrupts are relatively infrequent, for example, they occur every 10 ms on an AIX® system, the overhead added by detection code in the "tick" interrupt handling path is essentially negligible.

FIG. 3 is a block diagram that schematically illustrates a system for detecting and reporting an excessive period of interrupt disablement in operating system programming in a data processing system according to an exemplary embodiment of the present invention. The system is generally designated by reference number 300, and comprises an operating system (OS) 302, which may, for example, be implemented as an operating system that runs on processing unit 206 in FIG. 2. A timer interrupt mechanism, designated by reference number 304 generates periodic timer interrupts in operating system 302, typically to guarantee proper time slicing behavior. These interrupts occur relatively infrequently, for example, every 10 ms in an AIX® system.

As each timer tick is fielded by OS 302, it interrupts another operating system task. If that task was already running partially disabled for interrupts, a tick count in a tick counter 306 is incremented in the context structure of the interrupted task. If the tick count reaches a predefined threshold indicating that the task has been disabled for an excessive period of time, that information is logged in log 308. The information in log 308 may then be used to assist a software developer or another entity in identifying problem areas that may benefit from redesign of code to prevent the excessive period of disablement.

In effect, the present invention records state information periodically (by counting ticks), and reports whenever any piece of kernel code remains disabled for more than a predefined amount of time. The present invention thus profiles disabled central processing unit (cpu) time to assist a developer in identifying problem areas in code that may need correcting.

A particular code may also be fully disabled for interrupts as opposed to being only partially disabled. In the partially disabled case, as indicated above, monitoring can be conducted as each "tick" occurs, and reported as soon as an offending code exceeds the predefined time limit. In the case of fully disabled code, however, the next regularly scheduled "tick" interrupt will be blocked (held pending in the hardware) so that any excessive period of disablement cannot be detected until the offending code re-enables for interrupts. According to an exemplary embodiment of the present invention, at that time, the interrupt is fielded and it is determined how late it is, using, for example, timing mechanism 310 in FIG. 3. If it is already later than a predefined threshold, the excessiveness is reported as described above. In this case of full disablement, although the code cannot be "caught" in the middle of its disabled operation; it can be caught at the end of the operation, thus still providing some useful information to assist in problem debugging.

An important advantage of the present invention is that it adds negligible overhead to an operating system. When a currently enabled code segment disables for interrupts, the tick count is merely zeroed in its machine context structure. Similarly, when a hardware interrupt is taken by the software, the tick count is initialized to zero in the interruption context. Also, as each timer tick interrupt is taken, if the interrupted code was running partially disabled, the tick count is incremented in the interrupted context, and an error is logged if the count exceeds a predefined threshold. In effect, the present invention adds one very fast operation (store a zero) to the very frequent "disable me for interrupts" path, another identical operation to the much less frequent general interrupt handler path, and the only slightly more expensive add, compare test if reporting is desired to the relatively infrequent "timer tick" path. In an AIX® system, for example, the operation would be executed only 100 times per second per cpu.

Inasmuch as the detection overhead is so small, it can be allowed to operate "live" on customer systems, not just in a special testing mode environment during development. As a result, the present invention enables problems triggered in a customer environment that might not occur on the test floor to be detected and logged before they become critical problems for the customer. Problems can also be detected in customer or vendor written kernel extensions and device drivers which are not subject to in-house testing.

According to an aspect of the present invention, because the POWER hardware will, when both an I/O (Input/Output) and a timer interrupt are pending simultaneously, always reflect the I/O interrupt to the software first, it is necessary to compare the current time of day in the first level I/O interrupt handler to that of the next expected tick interrupt. If the I/O interrupt is seen to be occurring at a time when a timer interrupt can be predicted to be pending, that I/O interrupt is used to potentially trigger logging and to suppress the normal logging that would occur when the expected timer interrupt subsequently occurs. In this way, false reporting by the timer interrupt handler that the I/O interrupt handler was what was disabled too long is avoided.

A detail in the AIX® system service that enables for interrupts can allow a pending timer (or I/O) interrupt to be deferred until after the system dispatcher has chosen a new thread to run. As described above, it is simply checked if the dispatch is occurring at a time when a timer interrupt can be predicted to be pending, and reported from the dispatcher, if necessary, in the context of the current thread. This is a relatively rare occurrence, however, caused because the enablement service has logic that may call the dispatcher to allow the running thread to be preempted before actually enabling for interrupts.

It will be appreciated that inasmuch as counting ticks is a sampling operation, absolute precision when measuring the duration of a disabled period is being sacrificed for overhead saved by not trying to be more precise. In order to minimize the chance of a false report, some minimum number of physical interrupts should be counted against a context (when partially disabled) as well as seeing it reach the threshold. On an idle cpu, the normal tick rate is usually decreased to reduce overhead. The present invention prevents such slow (long duration) ticks from being able to prematurely trigger logging.

Precision attainable with the present invention could be improved (with some increase in overhead) by generating more frequent timer interrupts. Doing so, however, could also result in a larger number of error reports for relatively harmless situations.

Interrupts can be nested. In other words, a "base level" kernel routine might be interrupted for one purpose; and, while that interrupt is being handled, another interrupt might interrupt the now running interrupt handling code, etc. The present invention provides a separate tick counter in every interruption context structure to prevent time spent in different levels of interrupt handling from being misapplied among themselves or against the base level code. Even so, with a timing granularity of 10 ms, there will be some imprecision as discussed above.

Although a principal objective of the present invention is to assist developers in redesigning code which runs disabled for too long, this may not be possible in the short term. In such circumstances, the present invention also provides a mechanism that can be used to explicitly exempt known violators to prevent error reports against known problem code that has not yet been repaired.

Figure 4B:
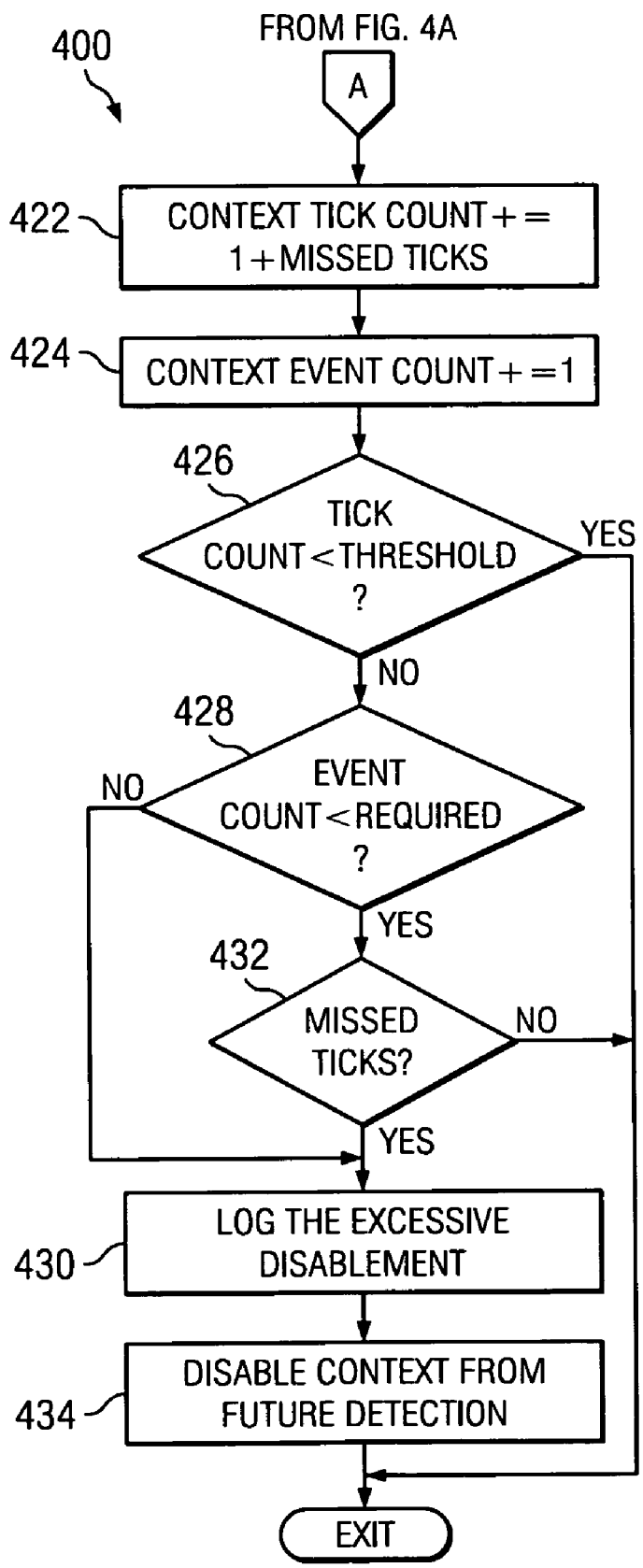

FIGS. 4A and 4B together illustrate a method for detecting and reporting an excessive period of interrupt disablement in operating system programming in a data processing system according to an exemplary embodiment of the present invention. The method is generally designated by reference number 400 and, as shown in FIG. 4A, uses the regularly scheduled timer tick interrupt that is typically provided in operating systems to guarantee proper time slicing behavior (Step 402). Missed ticks are detected (Step 404), and a determination is made whether the kernel debugger, which itself runs disabled for interrupts, is active (Step 406). If debug is not active (No output of Step 406), a determination is made whether an override flag is set, indicating that this excession has already been logged by either the I/O interrupt handler or by the dispatcher (Step 408). If the debugger is active (Yes output of Step 406), missed ticks are set to zero and debug is reset to inactive (Step 410), and a determination is then made whether the override flag is set (Step 408).

If the override flag is not set (No output of Step 408), a determination is made whether detection is off (Step 412). If the override flag has been set (Yes output of Step 408), missed ticks are set to zero and the override flag is reset (Step 414), and a determination is made whether detection is off (Step 412). If detection is off (Yes output of Step 412), the method ends. If detection is on (No output of Step 412), a determination is made whether the interrupted context is disabled (Step 416). If the interrupted context is disabled (Yes output of Step 416), a determination is made whether the context allows detection (Step 418). If the interrupted context is not disabled (No output of Step 416), a determination is made whether there are missed ticks (Step 420). If there are missed ticks (Yes output of Step 420), a determination is made whether the context allows detection (Step 418). If there are no missed ticks (No output of Step 420), the method ends.

If the context does not allow detection (No output of Step 418), the method ends. If the context does allow detection (Yes output of Step 418), the current context tick count is incremented by one, representing the effect of the scheduled timer tick, plus the number of missed ticks, representing that the scheduled interrupt may have been blocked for some time, (Step 422) as shown in FIG. 4B. The current context event count is also incremented by one (Step 424), and a determination is made whether the tick count is less than a predefined threshold (Step 426). If the tick count is less than the threshold (Yes output of Step 426), the method ends. If the tick count is not less than the predefined threshold, i.e. it has reached the predefined threshold (No output of Step 426), a determination is made whether the event count is less than required (Step 428). If the event count is not less than required (No output of Step 428), the excessive disablement is logged (Step 430).

If the event count is less than required (Yes output of Step 428), a determination is made whether there are missed ticks (Step 432). If there are no missed ticks (No output of Step 432), the method ends. If there are missed ticks (Yes output of Step 432), the excessive disablement is logged (Step 430). The context is then disabled from future detection (Step 434), and the method ends.

The present invention thus provides a method and system for detecting and reporting an excessive period of interrupt disablement in operating system programming in a data processing system. A method for detecting and reporting an excessive period of disablement in operating system programming in a data processing system includes determining, at a plurality of scheduled times, if an operating system task is running disabled for interrupts, and reporting an excessive disablement if the operating system task runs continuously disabled for interrupts for a predefined number of consecutive scheduled times.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting and reporting an excessive period of disablement in operating system programming in a data processing system, the method comprising:

determining, at a plurality of scheduled times, if an operating system task is running disabled for interrupts, wherein the operating system task runs disabled for interrupts when processing of code for the operating system task is temporarily suspended to execute another section of code for a different system task; and reporting an excessive disablement if the operating system task runs disabled for interrupts for a predefined number of consecutive scheduled times.

2. The computer implemented method according to claim 1, wherein determining, at a plurality of scheduled times, if an operating system task is running disabled for interrupts, comprises:

determining, at a plurality of regularly scheduled timer tick interrupts of the operating system that assure correct time slicing for the operation system, if an operating system task is running disabled for interrupts.

3. The computer implemented method according to claim 2, wherein the plurality of regularly scheduled timer tick interrupts of the operating system occur about every 10 milliseconds.

4. The computer implemented method according to claim 2, wherein reporting an excessive disablement if the operating system task runs disabled for interrupts for a predefined number of consecutive scheduled times, comprises:

counting a number of consecutive scheduled timer tick interrupts during which the operating system task is determined to be running disabled for interrupts;

determining if the counted number of consecutive scheduled timer tick interrupts has reached the predefined number of consecutive timer tick interrupts; and reporting an excessive disablement if the counted number of consecutive scheduled timer tick interrupts has reached the predefined number of consecutive timer tick interrupts.

5. The computer implemented method according to claim 4, wherein the predefined number of consecutive timer tick interrupts comprises at least three consecutive timer tick interrupts.

6. The computer implemented method according to claim 4, and further comprising:

determining if at least a predefined minimum number of physical interrupts has occurred, wherein reporting an excessive disablement if the counted number of consecutive scheduled timer tick interrupts has reached the predefined number of consecutive timer tick interrupts, comprises:

reporting an excessive disablement if the counted number of consecutive scheduled timer tick interrupts has reached the predefined number of consecutive timer tick interrupts and if at least the predefined minimum number of physical interrupts has occurred.

7. The computer implemented method according to claim 2, wherein the method detects and reports an excessive period of partial disablement in operating system programming in a data processing system, and wherein the method further comprises:

if the operating system programming is fully disabled, determining a lateness of a regularly scheduled timer tick interrupt when the fully disabled operating system programming becomes enabled or partially disabled; and reporting an excessive disablement if the regularly scheduled timer tick interrupt is later than a predefined period of time.

8. The computer implemented method according to claim 2, and further comprising:

determining if an Input/Output interrupt occurs at a time when a regularly scheduled timer tick interrupt is predicted to be pending; and determining if an operating system task is running disabled for interrupts at the time of the Input/Output interrupt instead of at the time of the regularly scheduled timer tick interrupt predicted to be pending.

9. The computer implemented method according to claim 1, wherein reporting an excessive disablement if the operating system task runs disabled for interrupts for a predefined number of consecutive scheduled times, comprises:

entering the excessive disablement in a log.

10. A system for detecting and reporting an excessive period of disablement in operating system programming in a data processing system, comprising:

a monitoring mechanism for determining, at a plurality of scheduled times, if an operating system task is running disabled for interrupts, wherein the operating system task is running disabled for interrupts when processing of code for the operating system task is temporarily suspended to execute another section of code for a different system task; and a reporting mechanism for reporting an excessive period of disablement if the operating system task runs disabled for interrupts for a predefined number of consecutive scheduled times.

11. The system according to claim 10, wherein the monitoring mechanism comprises:

a monitor for monitoring, at a plurality of regularly scheduled timer tick interrupts of the operating system that assure correct time slicing for the operation system, if an operating system task is running disabled for interrupts.

12. The system according to claim 11, wherein the plurality of regularly scheduled timer tick interrupts of the operating system occur about every 10 milliseconds.

13. The system according to claim 11, wherein the reporting mechanism comprises:

a counter for counting a number of consecutive scheduled timer tick interrupts during which the operating system task is determined to be running disabled for interrupts;

a mechanism for determining if the counted number of consecutive scheduled timer tick interrupts has reached the predefined number of consecutive timer tick interrupts; and a reporting mechanism for maintaining a record of an excessive disablement if the counted number of consecutive scheduled timer tick interrupts has reached the predefined number of consecutive timer tick interrupts.

14. The system according to claim 13, wherein the reporting mechanism comprises a log.

15. A computer program product, comprising:

a computer usable medium having computer usable program code for detecting an excessive period of disablement in operating system programming in a data processing system, the computer program product comprising:

computer usable program code configured to determine, at a plurality of scheduled times, if an operating system task is running disabled for interrupts, wherein the operating system task is running disabled for interrupts when processing of code for the operating system task is temporarily suspended to execute another section of code for a different system task; and computer usable program code configured to report an excessive disablement if the operating system task runs disabled for interrupts for a predefined number of consecutive scheduled times.

16. The computer program product according to claim 15, wherein the computer usable program code configured to determine, at a plurality of scheduled times, if an operating system task is running disabled for interrupts, comprises:

computer usable program code configured to determine, at a plurality of regularly scheduled timer tick interrupts of the operating system that assure correct time slicing for the operation system, if an operating system task is running disabled for interrupts.

17. The computer program product according to claim 16, wherein the computer usable program code configured to report an excessive disablement if the operating system task runs disabled for interrupts for a predefined number of consecutive scheduled timer tick interrupts, comprises:

computer usable program code configured to count a number of consecutive scheduled timer tick interrupts during which the operating system task is determined to be running disabled for interrupts;

computer usable program code configured to determine if the counted number of consecutive scheduled timer tick interrupts has reached the predefined number of consecutive timer tick interrupts; and computer usable program code configured to report an excessive disablement if the counted number of consecutive scheduled timer tick interrupts has reached the predefined number of consecutive timer tick interrupts.

18. The computer program product according to claim 17, wherein the predefined number of consecutive timer tick interrupts comprises at least three consecutive timer tick interrupts.

19. The computer program product according to claim 16, wherein the computer program product detects and reports an excessive period of partial disablement in operating system programming in a data processing system, and wherein the computer program product further comprises:

if the operating system programming is fully disabled, computer usable program code configured to determine a lateness of a regularly scheduled timer tick interrupt when the fully disabled operating system programming becomes enabled or partially disabled; and computer usable program code configured to report an excessive disablement if the regularly scheduled timer tick interrupt is later than a predefined period of time.

20. The computer program product according to claim 15, wherein the computer usable program code configured to report an excessive disablement if the operating system task runs disabled for interrupts for a predefined number of consecutive scheduled times, comprises:

computer usable program code configured to enter the excessive disablement in a log.

* * * * *